(12) United States Patent  
Canberk et al.

(10) Patent No.: US 12,088,781 B2  
(45) Date of Patent: Sep. 10, 2024

(54) HYPER-CONNECTED AND SYNCHRONIZED AR GLASSES

(71) Applicants: Ilteris Canberk, Marina Del Rey, CA (US); Shin Hwun Kang, Los Angeles, CA (US); Sven Kratz, Mercer Island, WA (US); Brian Anthony Smith, New York, NY (US); Yu Jiang Tham, Seattle, WA (US); Rajan Vaish, Beverly Hills, CA (US)

(72) Inventors: Ilteris Canberk, Marina Del Rey, CA (US); Shin Hwun Kang, Los Angeles, CA (US); Sven Kratz, Mercer Island, WA (US); Brian Anthony Smith, New York, NY (US); Yu Jiang Tham, Seattle, WA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 128 days.

(21) Appl. No.: 17/565,839

(22) Filed: Dec. 30, 2021

(65) Prior Publication Data

US 2023/0217007 A1 Jul. 6, 2023

(51) Int. Cl.
*H04N 13/398* (2018.01)
*H04L 65/1069* (2022.01)
(Continued)

(52) U.S. Cl.
CPC ....... *H04N 13/398* (2018.05); *H04L 65/1069* (2013.01); *H04L 65/1089* (2013.01);
(Continued)

(58) Field of Classification Search
CPC .. H04N 13/398; H04N 13/332; H04N 13/111; H04N 13/366; H04N 2213/008; H04L 65/1069; H04L 65/1089
See application file for complete search history.

(56) References Cited

U.S. PATENT DOCUMENTS 8,914,472 B1 * 12/2014 Lee ............ G06Q 30/04  
709/219  
10,403,050 B1 * 9/2019 Beall ............ G06T 7/292  
(Continued)

FOREIGN PATENT DOCUMENTS

WO 2013049248 A2 4/2013

OTHER PUBLICATIONS

International Search Report and Written Opinion received in Patent Cooperation Treaty Application No. PCT/US2022/050149, dated Mar. 27, 2023, 12 pages.

*Primary Examiner* — Terrell M Robinson
(74) *Attorney, Agent, or Firm* — CM Law; Stephen J. Weed

(57) ABSTRACT

Systems and methods are described for selectively sharing audio and video streams amongst electronic eyewear devices. Each electronic eyewear device includes a camera arranged to capture a video stream in an environment of the wearer, a microphone arranged to capture an audio stream in the environment of the wearer, and a display. A processor of each electronic eyewear device executes instructions to establish an always-on session with other electronic eyewear devices and selectively shares an audio stream, a video stream, or both with other electronic eyewear devices in the session. Each electronic eyewear device also generates and receives annotations from other users in the session for display with the selectively shared video stream on the display of the electronic eyewear device that provided the selectively shared video stream. The annotation may include manipulation of an object in the shared video stream or overlay images registered with the shared video stream.

20 Claims, 13 Drawing Sheets

(51) Int. Cl.
*H04L 65/1089* (2022.01)
*H04N 13/111* (2018.01)
*H04N 13/332* (2018.01)
*H04N 13/366* (2018.01)

(52) U.S. Cl.
CPC ......... *H04N 13/111* (2018.05); *H04N 13/332* (2018.05); *H04N 13/366* (2018.05); *H04N 2213/008* (2013.01)

(56) References Cited

U.S. PATENT DOCUMENTS

| | | | |
|---|---|---|---|
| 2015/0243078 A1* | 8/2015 | Watson | G06F 3/1454 |
| | | | 345/547 |
| 2015/0348327 A1 | 12/2015 | Zalewski | |
| 2017/0269685 A1* | 9/2017 | Marks | A63F 13/533 |
| 2020/0394012 A1* | 12/2020 | Wright, Jr. | G06F 3/011 |
| 2021/0319403 A1* | 10/2021 | Platt | H04L 65/4053 |
| 2021/0374391 A1 | 12/2021 | Jorasch et al. | |
| 2022/0030214 A1* | 1/2022 | Sinharoy | H04N 13/194 |

* cited by examiner

HYPER-CONNECTED AND SYNCHRONIZED AR GLASSES

TECHNICAL FIELD

Examples set forth in the present disclosure relate to systems and methods for enabling always on, no friction, hyper-connection between wearers of augmented reality (AR) portable electronic devices, including wearable electronic eyewear devices such as smart glasses. More particularly, but not by way of limitation, the present disclosure describes systems and methods to enable connected wearers of electronic eyewear devices to see, show, co-listen, chat, and annotate in real-time as if their physical senses were synchronized via the electronic eyewear devices.

BACKGROUND

Wearable electronic devices such as electronic eyewear devices may communicate with application programs running on mobile devices such as a user's mobile computing device and, in some cases, may communicate directly with a server. In either case, the electronic eyewear device may support direct device integration with communication application backend services as well as third-party application programming interfaces (APIs) such as text-to-speech, the SHAZAM PLAYER® app, object recognition, and the like. Some mobile applications enable users of mobile devices to share augmented reality (AR) content with wearers of electronic eyewear devices. The wearer of the electronic eyewear devices may select display features through interaction with the electronic eyewear device.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
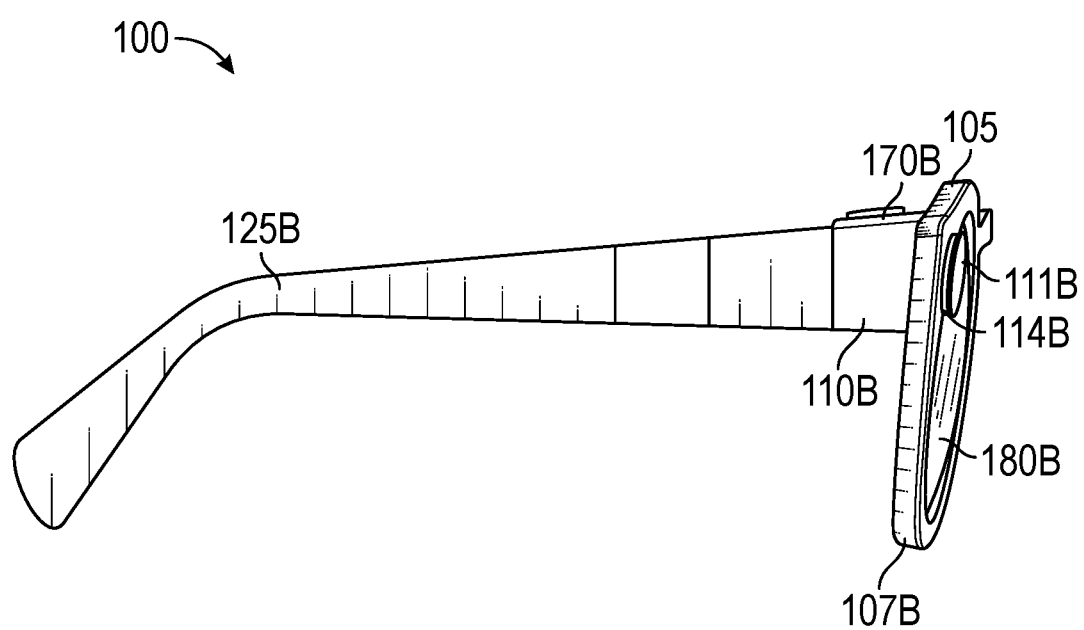
FIG. 1A illustrates a side view of an example hardware configuration of an electronic eyewear device showing a right optical assembly with an image display.

A system is provided that hyper connects two or more users of portable electronic eyewear devices in an always-on session so that the users may share experiences instantaneously, without any friction, and without any process of calling and accepting. Once the two or more users have consented to shared use of each other's camera, microphone, speakers, and screen, the two or more users may establish a session in which the users are connected and may share each other's camera, microphone, speakers, and screen at any time during the session. The duration of the session may be mutually set or modified by any party at any time. The connected electronic eyewear devices may implement several features and use cases that permit two or more users to almost synchronize their senses—ears, eyes, speech—such that any of the parties may seamlessly access and hyper-connect to the electronic eyewear device of another user without any friction. For example, the electronic eyewear devices may provide point of view (POV) streams, audio streams, and annotation streams that are shared amongst wearers of the electronic eyewear devices that are connected in a session.

In the case of POV streams, a session may comprise an always-on connection that is provided between two or more electronic eyewear devices. A first user may tap on her electronic eyewear devices to elect to instantly show another participant in the session what the first user is currently seeing. For example, the first user may be watching a soccer game on television where a player is about to score a goal. The first user may tap on the electronic eyewear device to instantly connect with one or more friends to experience the goal together. The electronic eyewear devices thus permit a wearer to drop-in and see what their friend is doing at any given moment, without any connection set up.

In the case of audio streams, with an always-on connection, a first user may tap on their electronic eyewear device to elect to co-listen to a piece of music, completely synchronized, with a second wearer of another electronic eyewear device who is participating in a session. The first user also may drop-in and listen to what their friend is listening to, live, in real time.

In the case of annotation streams, a first user may annotate objects in front of another user of the electronic eyewear devices by annotating the POV stream of the other user such that the other user can see the annotation in real-time on their electronic eyewear device. For example, while a first user is in a grocery store, a second user may draw a path on the POV stream from the first user to help the first user navigate to the cereal section. The second user may then use the annotation feature to circle their favorite brand in the first user's POV stream, in AR, in real-time.

This disclosure is thus directed to systems and methods for selectively sharing audio and video streams amongst electronic eyewear devices. Each electronic eyewear device includes a camera arranged to capture a video stream in an environment of the wearer, a microphone arranged to capture an audio stream in the environment of the wearer, and a display. A processor of each electronic eyewear device executes instructions to establish an always-on session with other electronic eyewear devices and selectively shares an audio stream, a video stream, or both with other electronic eyewear devices in the session. Each electronic eyewear device also generates and receives annotations from other users in the session for display with the selectively shared video stream on the display of the electronic eyewear device that provided the selectively shared video stream. The annotation may include manipulation of an object in the shared video stream or an overlay image registered with the shared video stream.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device and associated system for providing session amongst users of electronic eyewear devices for sharing audio content, video content, or both will be described with respect to FIGS. 1-9.

The system described herein includes three main hardware components: an electronic eyewear device, a mobile device, and a server. The electronic eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the electronic eyewear device and mobile device, as well as examples of system operation, will be described with respect to FIGS. 7-9. Such software components include system software for communicating and displaying streams amongst respective electronic eyewear devices and mobile device software for establishing and managing the connections amongst the electronic eyewear devices. However, it will be appreciated that the mobile device, the server, or both may be removed from the system provided the electronic eyewear device is adapted to include sufficient processing and storage capabilities to perform the described functions of the mobile device, the server, or both.

Electronic Eyewear Device

In sample configurations, electronic eyewear devices with augmented reality (AR) capability are used in the systems described herein. Electronic eyewear devices are desirable to use in the system described herein as such devices are scalable, customizable to enable personalized experiences, enable effects to be applied anytime, anywhere, and ensure user privacy by enabling only the wearer to see the transmitted information. An electronic eyewear device such as SPECTACLES® available from Snap, Inc. of Santa Monica, California, may be used without any specialized hardware in a sample configuration.

Figure 2A:
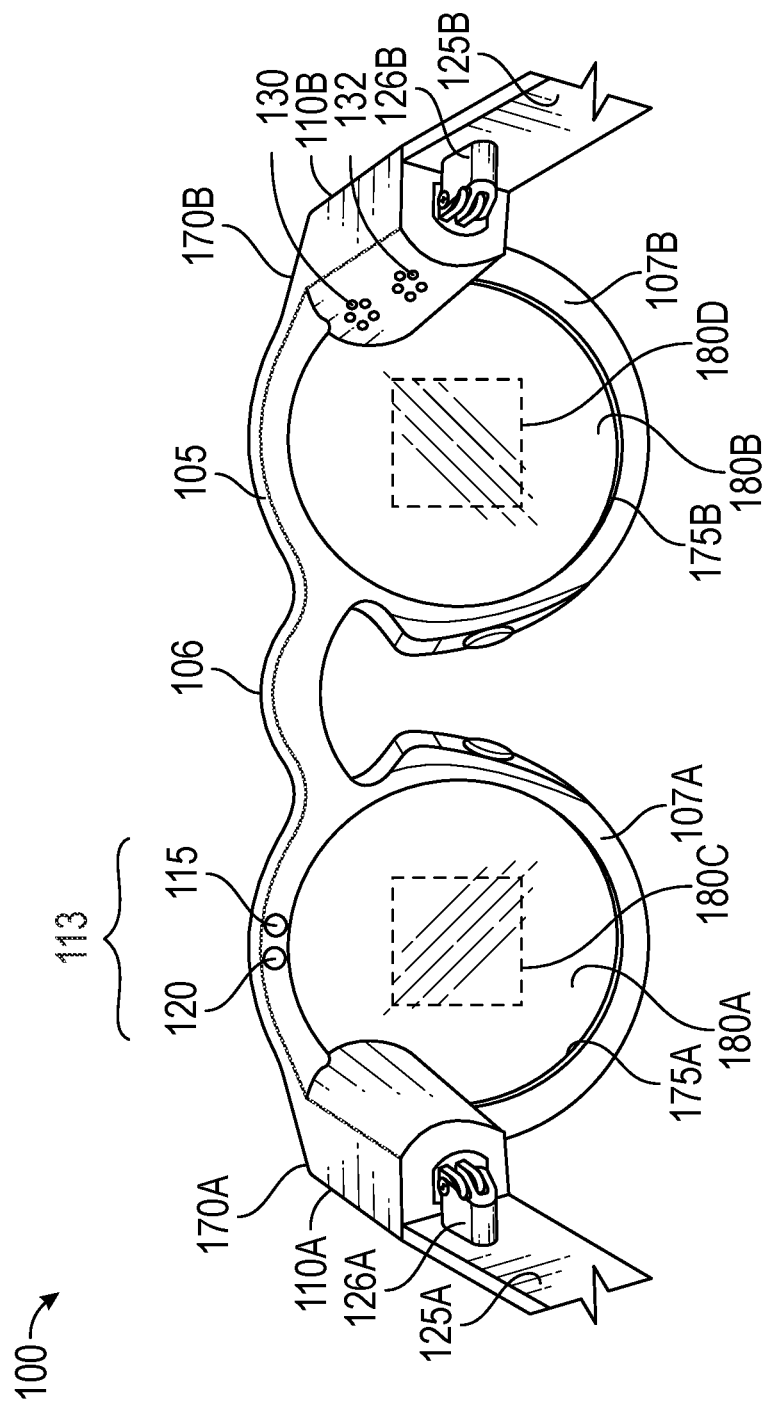
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 3) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 412 of FIG. 4) for digital processing along with a timestamp in which the image of the scene is captured. Image processor 412 may include circuitry to receive signals from the visible light camera 114A-B and to process those signals from the visible light cameras 114A-B into a format suitable for storage in the memory (element 434 of FIG. 4). The timestamp may be added by the image processor 412 or other processor that controls operation of the visible light cameras 114A-B. Visible light cameras 114A-B allow the stereo camera to simulate human binocular vision. Stereo cameras also provide the ability to reproduce three-dimensional images (image 315 of FIG. 3) based on two captured images (elements 358A-B of FIG. 3) from the visible light cameras 114A-B, respectively, having the same timestamp. Such three-dimensional images 315 allow for an immersive life-like experience, e.g., for virtual reality or video gaming. For stereoscopic vision, the pair of images 358A-B may be generated at a given moment in time—one image for each of the left and right visible light cameras 114A-B. When the pair of generated images 358A-B from the frontward facing field of view (FOV) 111A-B of the left and right visible light cameras 114A-B are stitched together (e.g., by the image processor 412), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 432 (FIG. 4) is coupled to the electronic eyewear device 100 and connected to the visible light cameras 114A-B and memory 434 (FIG. 4) accessible to the processor 432, and programming in the memory 434 may be provided in the electronic eyewear device 100 itself.

Figure 1B:
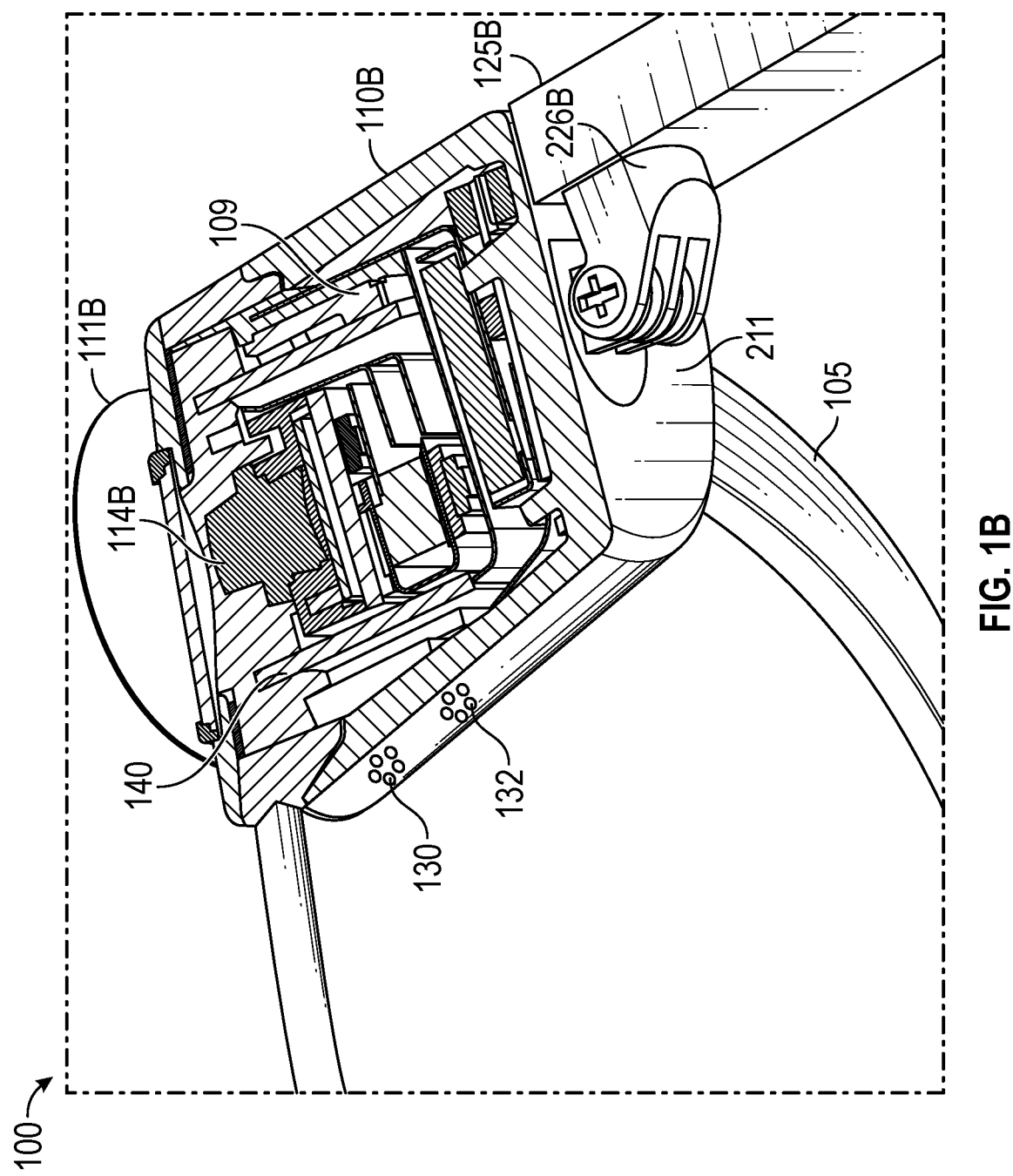
FIG. 1B illustrates a top cross-sectional view of a temple of the electronic eyewear device of FIG. 1A.
Figure 2B:
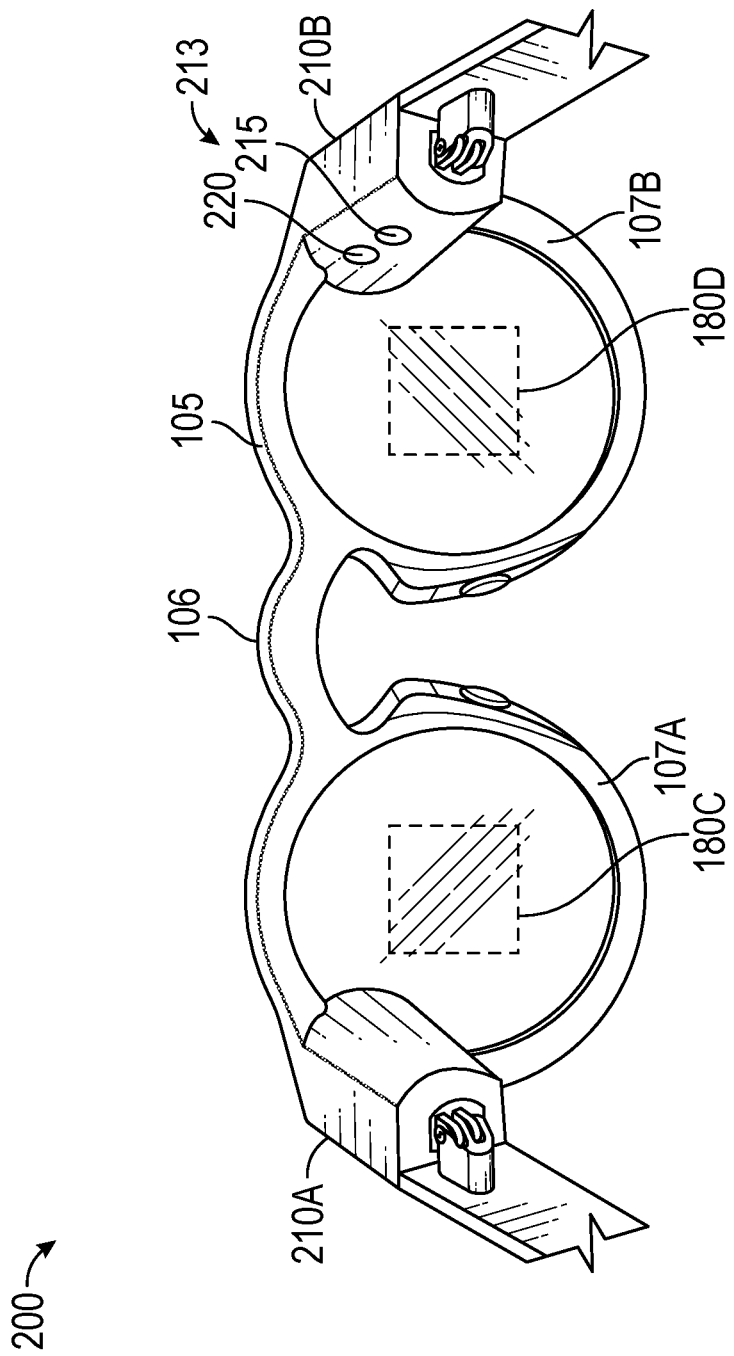
FIG. 2B illustrates a rear view of an example hardware configuration of another electronic eyewear device in an example hardware configuration.
Figure 2C:
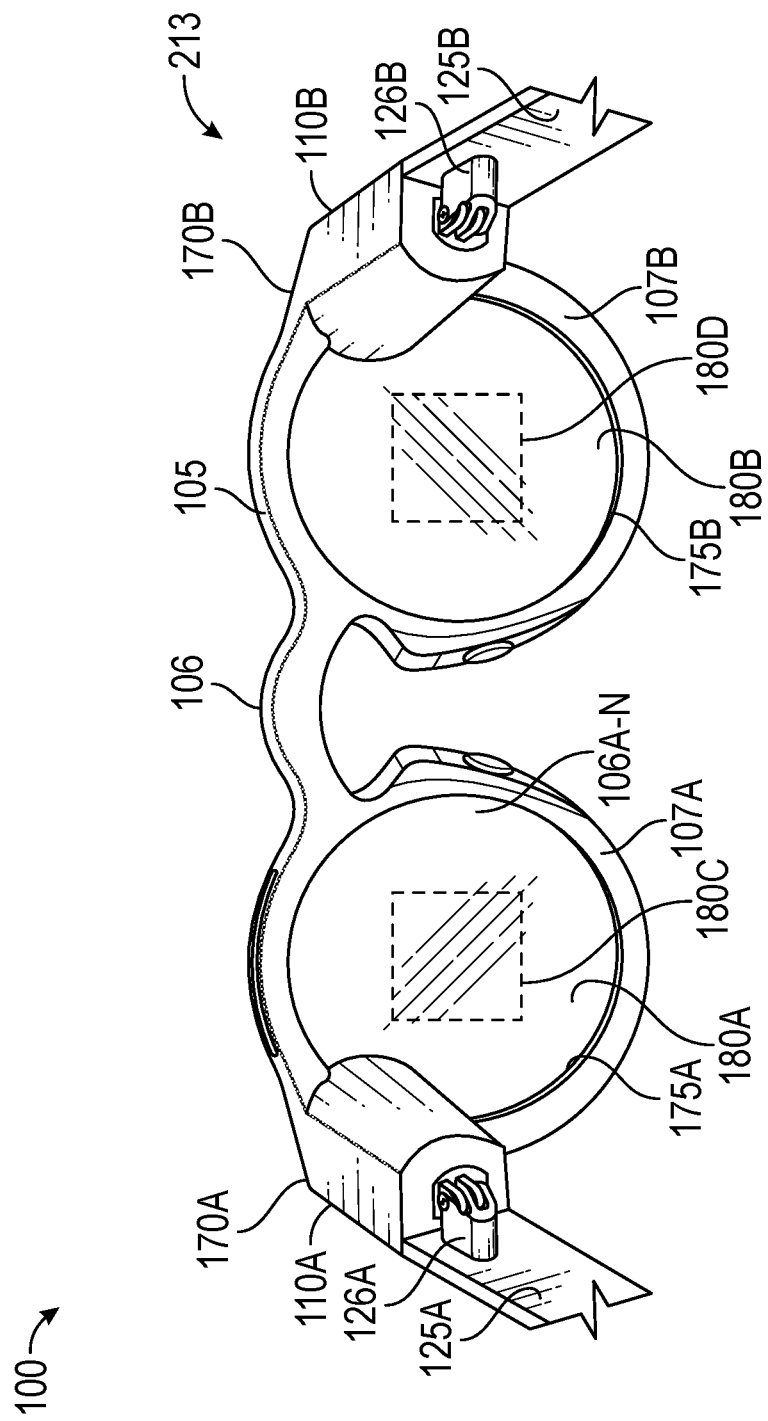
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 442 of FIG. 4) coupled to the see-through image displays 180C-D of optical assembly 180A-B to control the image displays 180C-D of optical assembly 180A-B to present the sequence of displayed images 315, which are described in further detail below. Electronic eyewear device 100 may further include the memory 434 and the processor 432 having access to the image display driver 442 and the memory 434, as well as programming in the memory 434. Execution of the programming by the processor 432 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 432 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the electronic eyewear device 100 to generate a successive displayed image of the sequence of displayed images based on the field of view adjustment. Execution of the programming by the processor 432 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis). or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
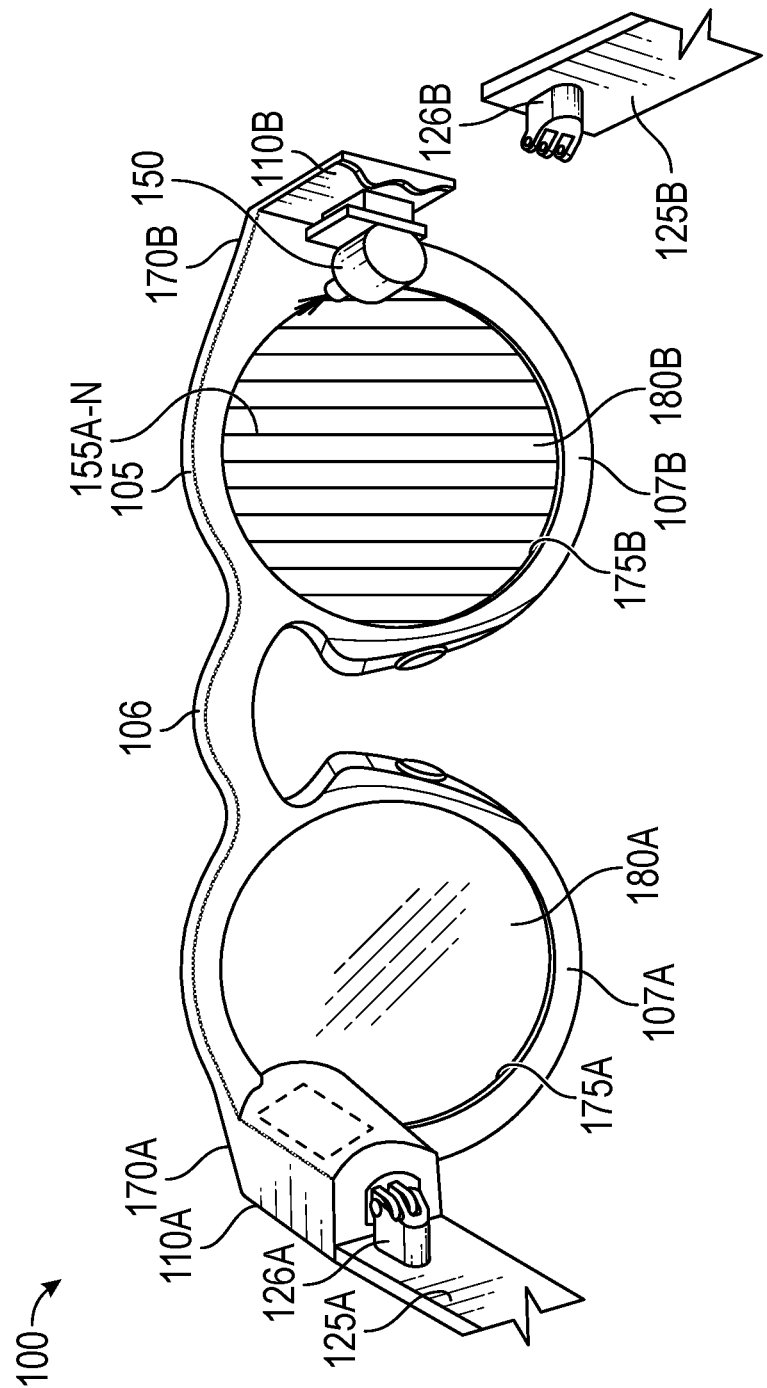

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have a different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips 155A-N' and a projector 150A (not shown) in left temple 110A). The second optical assembly 180B may include the second see-through image display 180D (e.g., a display matrix of FIG. 2C or optical strips 155A-N" and a projector 150B (shown as projector 150) in right temple 110B). The successive field of view of the successive displayed images may include an angle of view between about 15° to 30, and more specifically 24°, measured horizontally, vertically, or diagonally. The successive displayed images having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
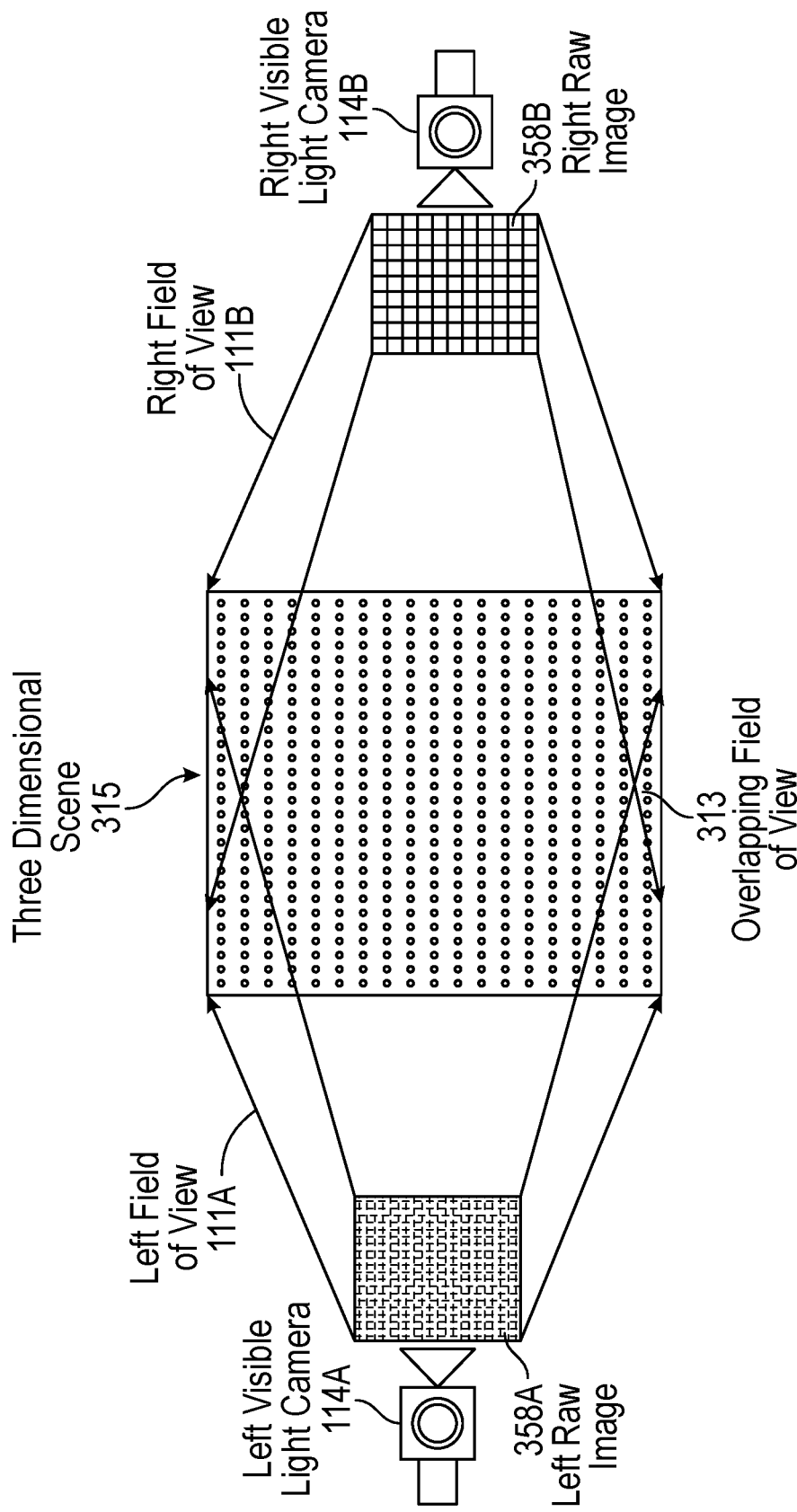
FIG. 3 illustrates an example of visible light captured by the left visible light camera as a left raw image and visible light captured by the right visible light camera as a right raw image.
Figure 4:
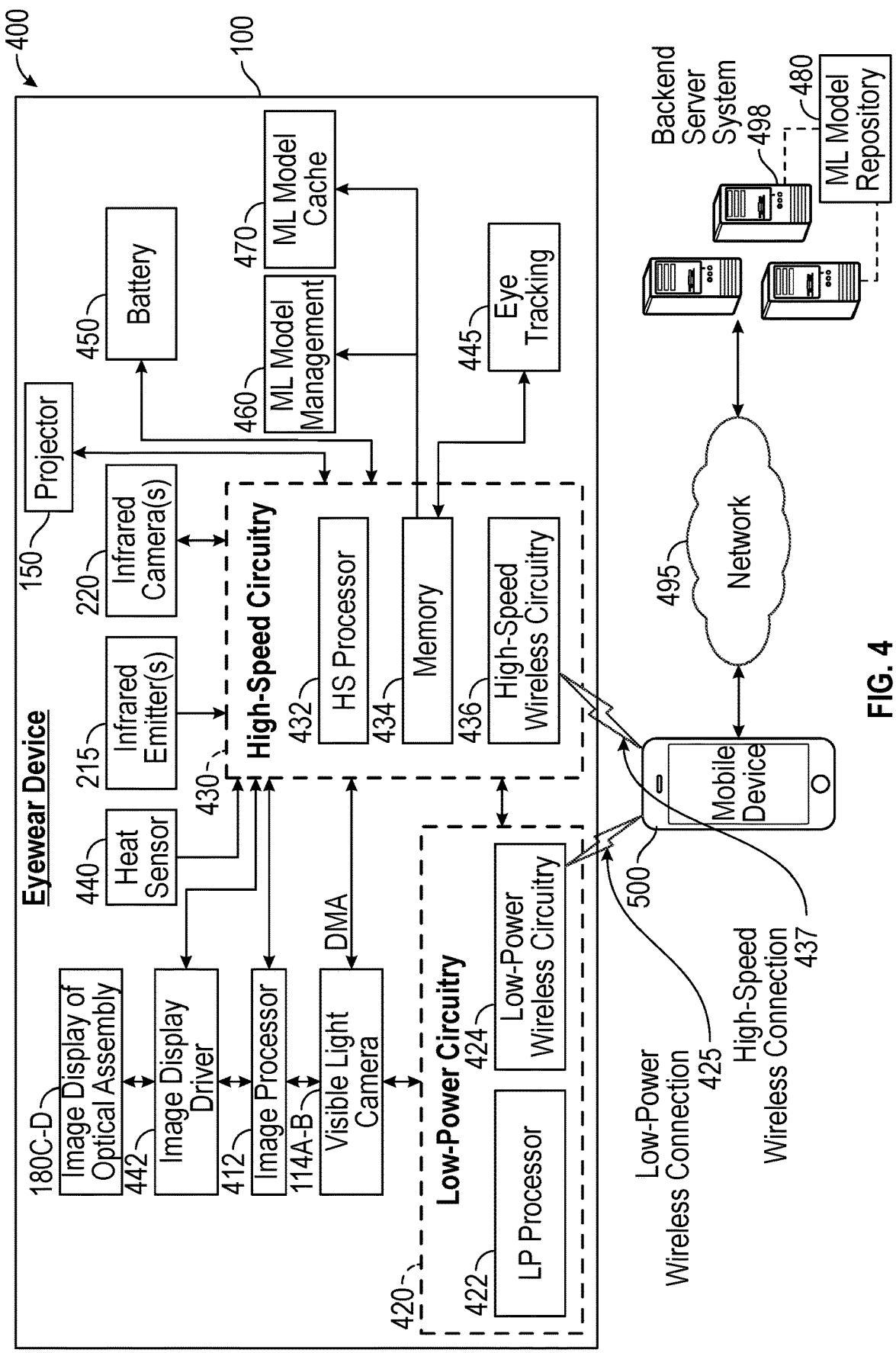
FIG. 4 illustrates a block diagram of electronic components of the electronic eyewear device in a system for hyper-connecting electronic eyewear devices in a sample configuration.

FIG. 3 illustrates an example of capturing visible light with cameras 114A-B. Visible light is captured by the left visible light camera 114A with a round field of view (FOV). 111A. A chosen rectangular left raw image 358A is used for image processing by image processor 412 (FIG. 4). Visible light is also captured by the right visible light camera 114B with a round FOV 111B. A rectangular right raw image 358B chosen by the image processor 412 is used for image processing by processor 412. Based on processing of the left raw image 358A and the right raw image 358B having an overlapping field of view 313, a three-dimensional image 315 of a three-dimensional scene, referred to hereafter as an immersive image, is generated by processor 412 and displayed by displays 180C and 180D and which is viewable by the user.

FIG. 4 illustrates a high-level functional block diagram including example electronic components disposed in electronic eyewear device 100 or 200. The illustrated electronic components include the processor 432, the memory 434, and the see-through image display 180C and 180D.

Memory 434 includes instructions for execution by processor 432 to implement the functionality of electronic eyewear devices 100 and 200, including instructions for processor 432 to control in the image 315. Processor 432 receives power from battery 450 and executes the instructions stored in memory 434, or integrated with the processor 432 on-chip, to perform the functionality of electronic eyewear devices 100 and 200 and to communicate with external devices via wireless connections.

The electronic eyewear devices 100 and 200 may incorporate an eye movement tracker 445 (e.g., shown as infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the electronic eyewear devices 100 or 200 using both a low-power wireless connection 425 and a high-speed wireless connection 437. Mobile device 500 is further connected to server system 498 via a network 495. The network 495 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 442, image processor 412, low-power circuitry 420, and high-speed circuitry 430. The components shown in FIG. 4 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 442 to present the sequence of displayed images, including the initial displayed image with the initial field of view and the successive displayed image with the successive field of view.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the left and right image displays 180C-D of the optical assembly 180A-B. High-speed processor 432 may be any processor capable of managing high-speed communications and operation of any general computing system needed for electronic eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the electronic eyewear device 100 or 200 and the operating system is stored in memory 434 for execution. In addition to any other responsibilities, the high-speed processor 432 executing a software architecture for the electronic eyewear device 100 or 200 is used to manage data transfers with high-speed wireless circuitry 436. In certain examples, high-speed wireless circuitry 436 is configured to implement Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the electronic eyewear devices 100 and 200 can include short range transceivers (BLU-ETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the electronic eyewear device 100 and 200, as can other elements of network 495.

Memory 434 includes any storage device capable of storing various data and applications, including, among other things, color maps, camera data generated by the left and right visible light cameras 114A-B and the image processor 412, as well as images generated for display by the image display driver 442 on the see-through image displays 180C-D of the optical assembly 180A-B. While memory 434 is shown as integrated with high-speed circuitry 430, in other examples, memory 434 may be an independent stand-alone element of the electronic eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed. As will be explained further below, an electronic eyewear device application 460 may be installed to run on the high-speed processor 432 to allow each user to experience (see, listen to) streams of content from an electronic eyewear device(s) 100 or 200 of, e.g., a remote friend by establishing a session with the remote electronic eyewear device(s) 100 or 200 of the friend using application 460.

Server system 498 may be one or more computing devices as part of a service or network computing system, for example, which includes a processor, a memory, and network communication interface to communicate over the network 495 with the mobile device 500 and electronic eyewear devices 100 and 200. Electronic eyewear devices 100 and 200 may be connected with a host computer. For example, the electronic eyewear devices 100 or 200 may be paired with the mobile device 500 via the high-speed wireless connection 437 or connected to the server system 498 via the network 495.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 442. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear devices 100 and 200 may optionally include additional peripheral device elements such as ambient light and spectral sensors, biometric sensors, heat sensor 440, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Mobile Device

Figure 5:
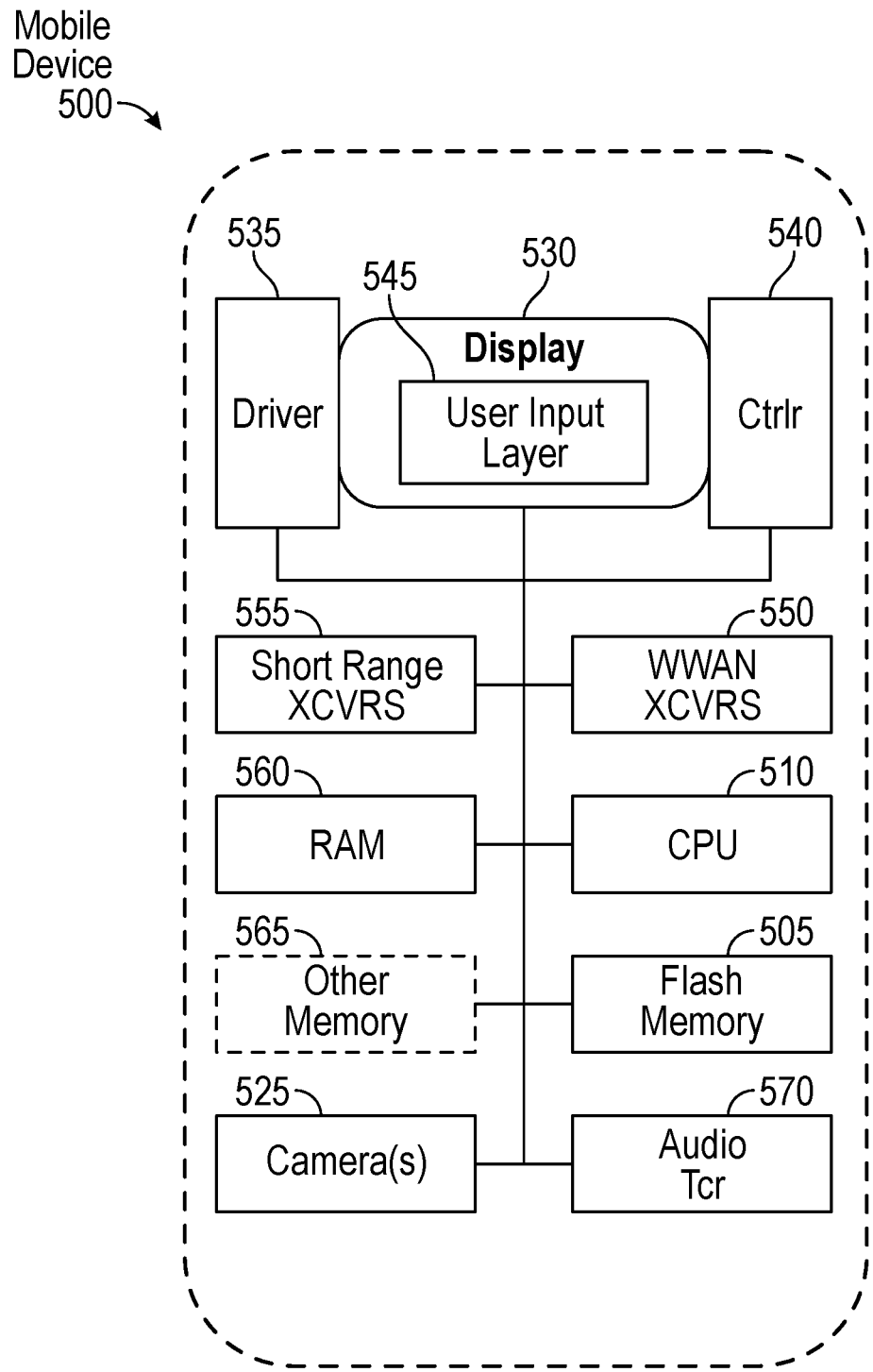
FIG. 5 illustrates a block diagram of electronic components of a mobile device adapted for use with the system of FIG. 4.

FIG. 5 illustrates a sample configuration of a mobile device 500 adapted to manage connections between electronic eyewear devices 100 or 200 in sample configurations. In particular, FIG. 5 is a high-level functional block diagram of an example mobile device 500 that a user may use to manage connections as described herein. Mobile device 500 may include a flash memory 505 that stores programming to be executed by the CPU 510 to perform all or a subset of the functions described herein. For example, the flash memory may store connection management software 515 for execution by CPU 510 to enable the user of the mobile device 500 to establish and manage connections with other electronic eyewear devices as described herein. The mobile device 500 may further include a camera 525 that comprises one or more visible-light cameras (first and second visible-light cameras with overlapping fields of view) or at least one visible-light camera and a depth sensor with substantially overlapping fields of view. Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, Bluetooth™, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or Bluetooth™ based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smart-phone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hardwired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple IOS (for iPhone or iPad devices), Windows Mobile, Amazon Fire OS, RIM BlackBerry OS, or the like.

Finally, the mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

Backend Server System

Techniques described herein also may be used with one or more of the computer systems described herein or with one or more other computer systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 6:
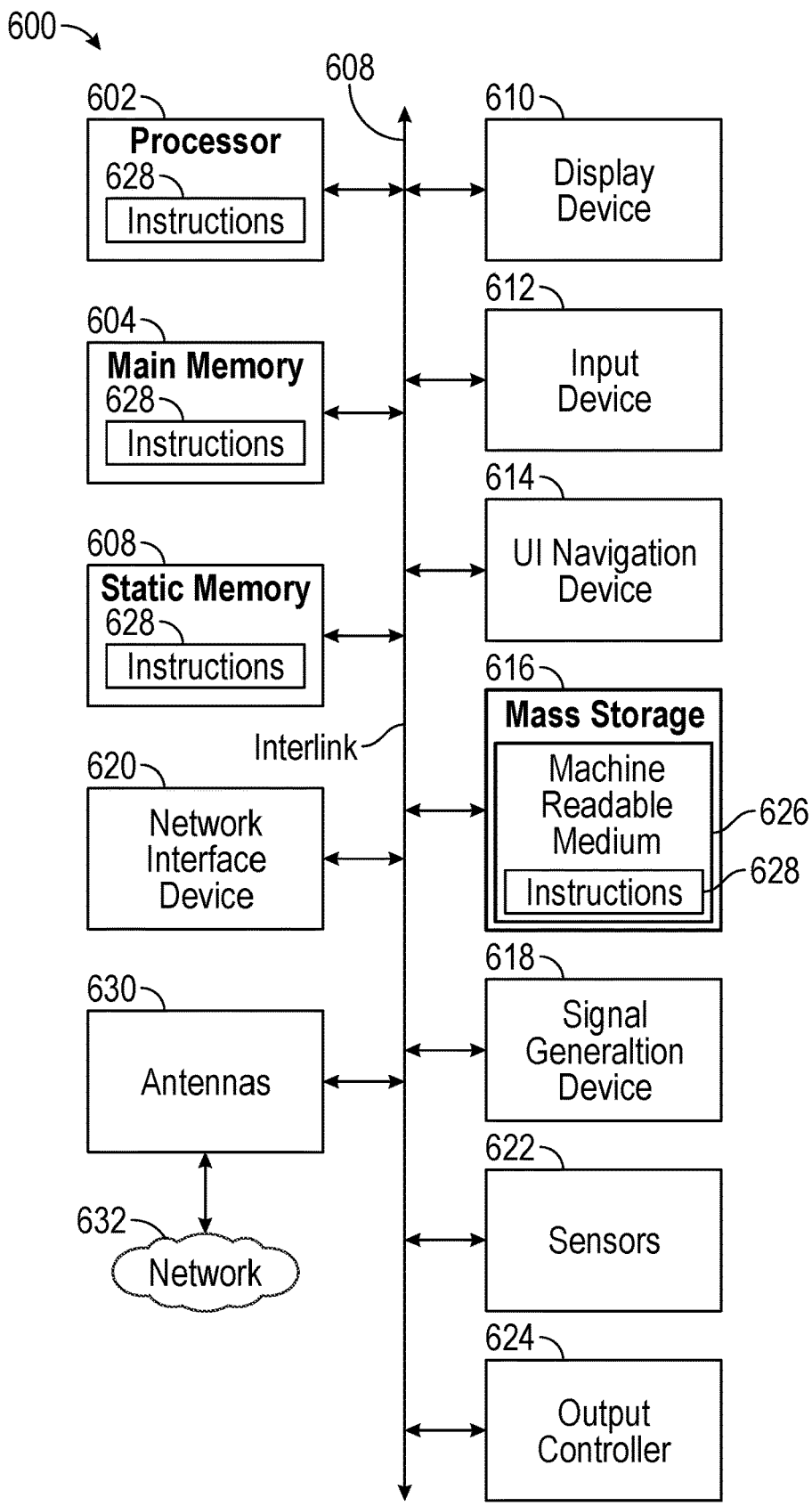
FIG. 6 illustrates a sample configuration of a computer system adapted to implement the server of the system of FIG. 4 in a sample configuration.

FIG. 6 illustrates a sample configuration of a computer system adapted to implement the systems and methods described herein. In particular, FIG. 6 illustrates a block diagram of an example of a machine 600 upon which one or more configurations of the backend server system 498 (FIG. 4) may be implemented. As described herein, the backend server system 498 may execute instructions for connecting respective electronic eyewear devices 100 or 200 and for storing AR generated objects received from a first user for transmission to a second user to annotate images. The backend server system 498 may also maintain a gallery of AR objects for use during annotation. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may implement the methods described herein by running the software used to implement the features described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

While the machine readable medium 626 is illustrated as a single medium, the term "machine readable medium" may include a single medium or multiple media (e.g., at least one of a centralized or distributed database, or associated caches and servers) configured to store the one or more instructions 628. The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Hyper-Connected Electronic Eyewear Devices

In sample configurations, the system described above may be adapted to connect two or more users of portable electronic eyewear devices 100 or 200 so that they may share experiences instantaneously, without any friction, and without any process of calling and accepting. The two or more users establish a connection between their portable electronic eyewear devices either directly, via their respective mobile phones, via a backend server, or by any combination thereof. Once the portable electronic eyewear devices of the two or more users are connected, the connected users may elect to consent to shared use of each other's camera, microphone, speakers, and screen. If the users consent to such use, the two or more users may be continuously connected throughout a session and share each other's camera, microphone, speakers, and screen at any time during the connected session like an audio/video walkie-talkie. The duration of the session may be mutually set or modified by a connected party at any time. The duration of the session may be impacted by considerations such as battery usage, privacy, and the like. Optionally, the respective portable electronic eyewear devices may be notified when another connected user has opted to "drop in" on a user's audio stream, video stream, or both. During a session, the connected portable electronic eyewear devices may implement several features and use cases that permit two or more users to almost synchronize their senses—ears, eyes, speech—such that any of the parties may seamlessly access a session and hyper-connect to another user without any friction.

As noted above, the portable electronic eyewear devices may provide point of view (POV) streams, audio streams, and annotation streams amongst the wearers of the electronic eyewear devices during a session.

In the case of POV streams, once a session is established between two or more electronic eyewear devices, a first user may tap on her electronic eyewear device and instantly show another user what the first user is seeing. For example, the first user may be watching a soccer game on television where a player is about to score a goal. The first user may tap on the electronic eyewear device to instantly connect with one or more friends that are participating in a session so that they may experience the goal together. The electronic eyewear devices thus permit a wearer to drop-in and see what their friend is doing at any given moment, without any friction.

Similarly, in the case of audio streams, upon establishment of a session between two or more electronic eyewear devices, a first user may tap on her electronic eyewear device to co-listen to a piece of music, completely synchronized, with one or more other wearers of an electronic eyewear device. The first user also may drop-in and listen to what their friend is listening to, live, in real time.

On the other hand, in the case of annotation streams, the POV stream of a first user may be provided to a second user of the connected electronic eyewear devices so that the second user may annotate objects in front of the first user in augmented reality so that the first user may see the annotations in real-time on the display of their electronic eyewear device. For example, while the first user is in a grocery store, the second user may draw a path on the display of the first user to help the first user navigate to the cereal section. The second user may further annotate the display to circle their favorite brand, in AR, in real-time.

To implement such functionality for providing hyper-connections amongst electronic eyewear devices, two software applications are implemented on the hardware described above. One application runs on a first electronic eyewear device 100 or 200, the associated mobile device 500 (iPhone/Android), or both, and one application runs on a second (and additional) electronic eyewear device 100 or 200, the associated mobile device 500, or both. Both partners in a pair use the applications to implement the functionality described herein.

In a sample configuration, a mobile device application 515 (FIG. 5) is installed on a mobile device 500 by each user by, for example, scanning a Snap Code available from Snap, Inc. of Santa Monica, California. Each user logs into the mobile device application 515 with their login information to establish an "always on" session with one or more other users. The "always on" session is like a walkie-talkie connection in that no calling or acceptance of the call is necessary for the ongoing communications. The "always on" session is established by selecting another user (e.g., a "friend" in a communications application such as SNAPCHAT® available from Snap, Inc. of Santa Monica, California) and sending a request to the other user to establish a session. An IP handshaking protocol is conducted to establish a link using IP session data between the respective parties and to authorize the other party to access each other party's camera, audio, and display of the other party's electronic eyewear device 100 or 200. Thus, in the established "always on" session, each party has bi-directional access to each other party's camera, audio, and display. The display interface of each party is thus modified to enable selection of the other party's camera, audio, and display so that the connected parties may drop in on what the party is viewing and listening to at any time during the "always on session" by providing the appropriate tap in a tap interface or other selection option (e.g., eye gaze selection) available on the electronic eyewear device 100 or 200. As desired, a party may be notified with at least one of a video message or sound indicating that the other party has dropped in and is accessing the audio or video feeds of the party's electronic eyewear device 100 or 200.

Once the user is signed in and has identified their metadata (i.e., a Pair ID and a user assignment, User A or User B) and has established a session with the electronic eyewear device 100 or 200 of at least one other user, the user also may set up parameters relating to limitations on access, time durations for drop-ins by other users, and the like. Once the session has been established, data streams may be shared amongst the session participants via the mobile devices 500. The respective users' electronic eyewear devices 100 or 200 also are paired to their respective mobile device applications 515 of their associated mobile devices 500 to leverage these connections. It will be appreciated by those skilled in the art that the electronic eyewear devices 100 or 200 also may be connected to each other without use of associated mobile devices 500 and servers 498 but that the electronic eyewear devices 100 or 200 in such configurations would need to be equipped with communications hardware and software to enable such communications.

The electronic eyewear device application 460 (FIG. 4) may be installed on the mobile device 500 or the user's electronic eyewear device 100 or 200 to allow each user to experience (see, listen) to streams of content from the connected electronic eyewear device(s) 100 or 200 of, e.g., a remote friend by establishing a connection with the remote friend. An electronic eyewear device 100 or 200 or mobile device 500 including the electronic eyewear device application 460 will be able to detect the data stream from the remote user and will load any auditory and visual content from the data stream into the user's display for the user to experience in real-time. In the examples described herein, two forms of visual AR content may be sent: 1) AR content registered with the real-time display for annotation, and 2) visual content from the other user's cameras. Audio content also may be provided independently or in synchronization with associated visual content.

The system so configured thus establishes an always-on session to connect the displays of the electronic eyewear devices 100 or 200 of respective users. The tapping of the electronic eyewear device by a first user may initiate and end sharing of streaming audio/video data during a session. Another user participating in the session may similarly initiate and end sharing of streaming data by tapping on her portable electronic eyewear device 100 or 200 when no stream is currently being shared. Conversely, the second user may tap her electronic eyewear device to see what the first user is seeing at a given point in time. In an example, an audio stream may be provided between respective session users that one of the users may switch to a video feed by tapping their electronic eyewear device when something of interest appears that is to be shared. Bidirectionality may also be provided by enabling a second user to tap to provide an interrupt during a session to end the stream from a first user so that a stream may be initiated by the second user.

Figure 7:
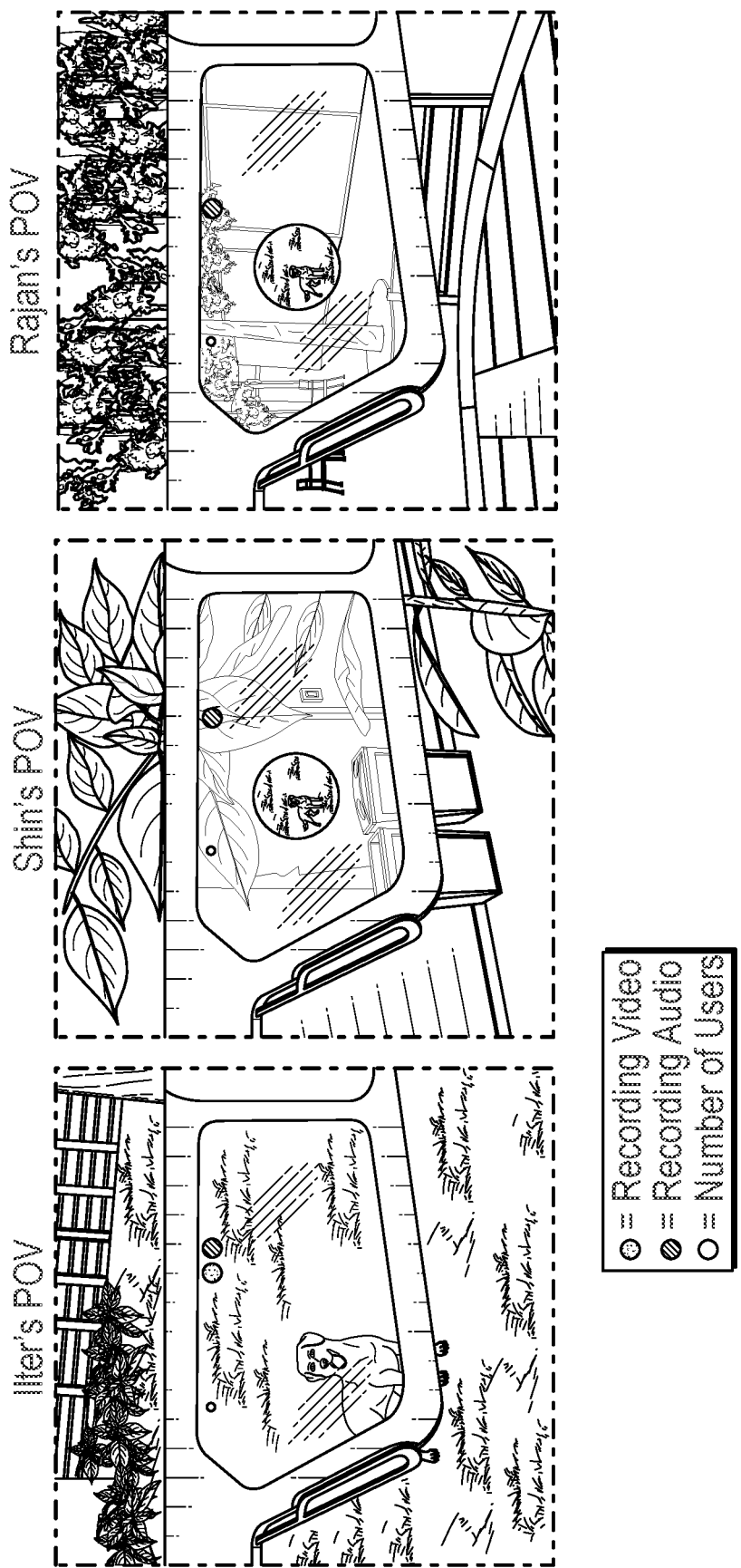
FIG. 7 illustrates the sharing of an image being viewed by a first user with second and third users participating in a session amongst the users' electronic eyewear devices in a sample configuration.

FIG. 7 is a sample illustration of the sharing of an image being viewed by a first user with second and third users participating in a session amongst the users' electronic eyewear devices 100 or 200. As illustrated, a first user records audio/video of a dog frolicking in her yard. The recorded audio/video stream is provided over the session connection with second and third users, and the audio/video stream is presented as a real-time feed in display areas of the electronic eyewear devices 100 or 200 of the second and third users.

Figure 8:
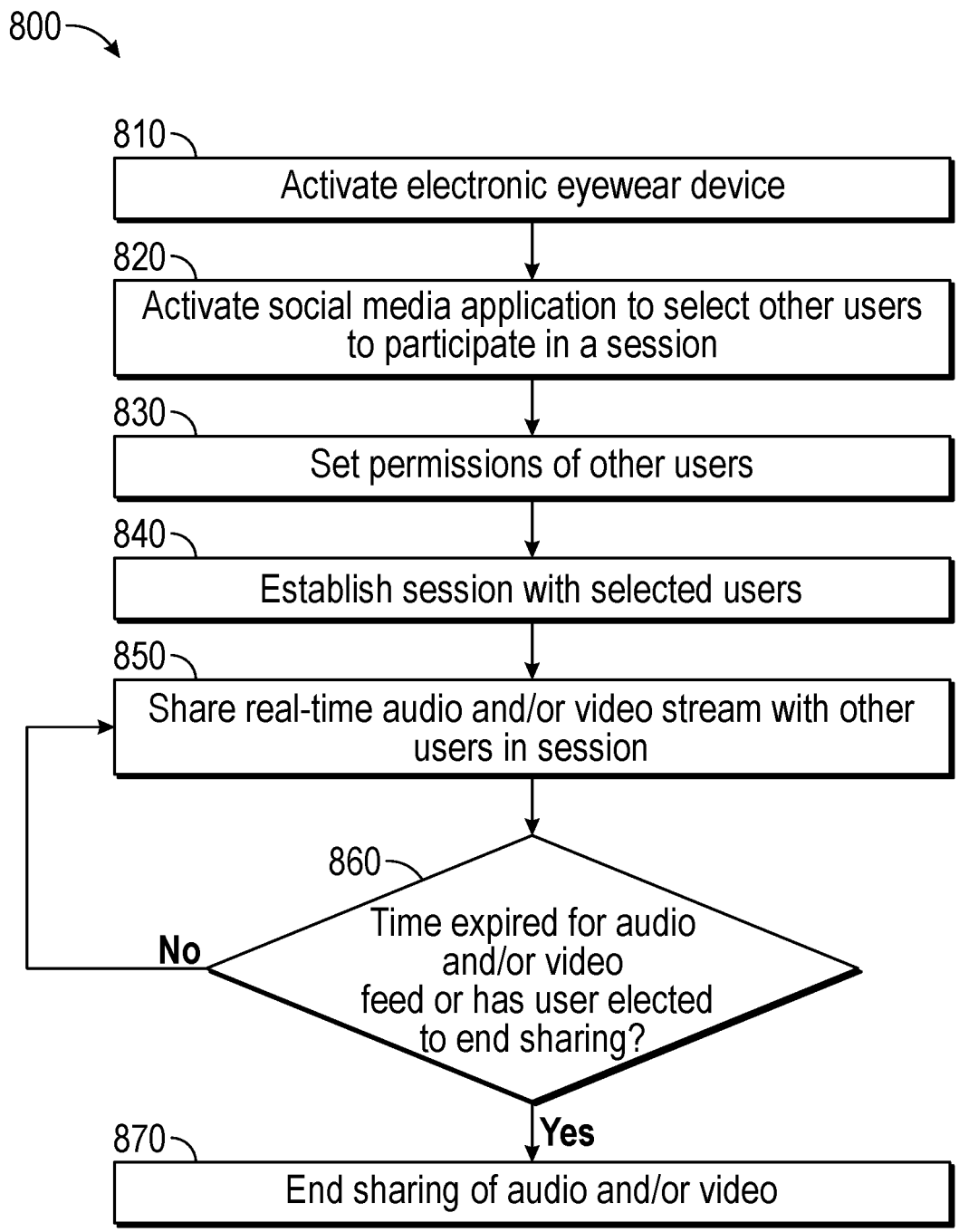
FIG. 8 illustrates a flowchart of software on each user's portable electronic eyewear device or associated mobile device for establishing a session and enabling another user of an electronic eyewear device to drop-in during a session to share the audio stream, video stream, or both from the point of view of a first user.

FIG. 8 illustrates a flowchart 800 of software on each user's portable electronic eyewear device 100 or 200 or associated mobile device 500 for establishing a session and enabling another user of an electronic eyewear device to drop-in during a session to share the audio stream, video stream, or both from the point of view of a first user. At 810, the first user activates her electronic eyewear device 100 or 200. At 820, the first user activates a social media application such as SNAPCHAT® available from Snap, Inc. of Santa Monica, California, to identify and select other users to participate in a session. The social media application may provide at 830 elections of permissions for the other users. For example, the first user may set the permissions of the selected users to access the audio stream, the video stream, or both from the first user's electronic eyewear device 100 or 200 including, for example, which camera feed may be accessed and for how long, whether the audio feed may be accessed and for how long, whether outputs of any other sensors of the first user's electronic eyewear device may be accessed, and the like. The permissions also may give the first user the option of being notified when the other users drop in, drop out, or both during the session. The session is then established at 840 and the permissions are shared with the other users. At 850, the first user may initiate an audio stream, video stream, or both to share with the other users, or the other users may request to drop in on the first user's current stream to thereby have remote access to the audio stream, video stream, or both of the first user from the point of view of the first user. The sharing may expire after a set amount of time or may continue at 860 until the sharing is ended by one or more of the participants in the session by tapping the user's electronic eyewear device or by providing the appropriate gesture to end the sharing. The sharing is then ended at 870.

Figure 9:
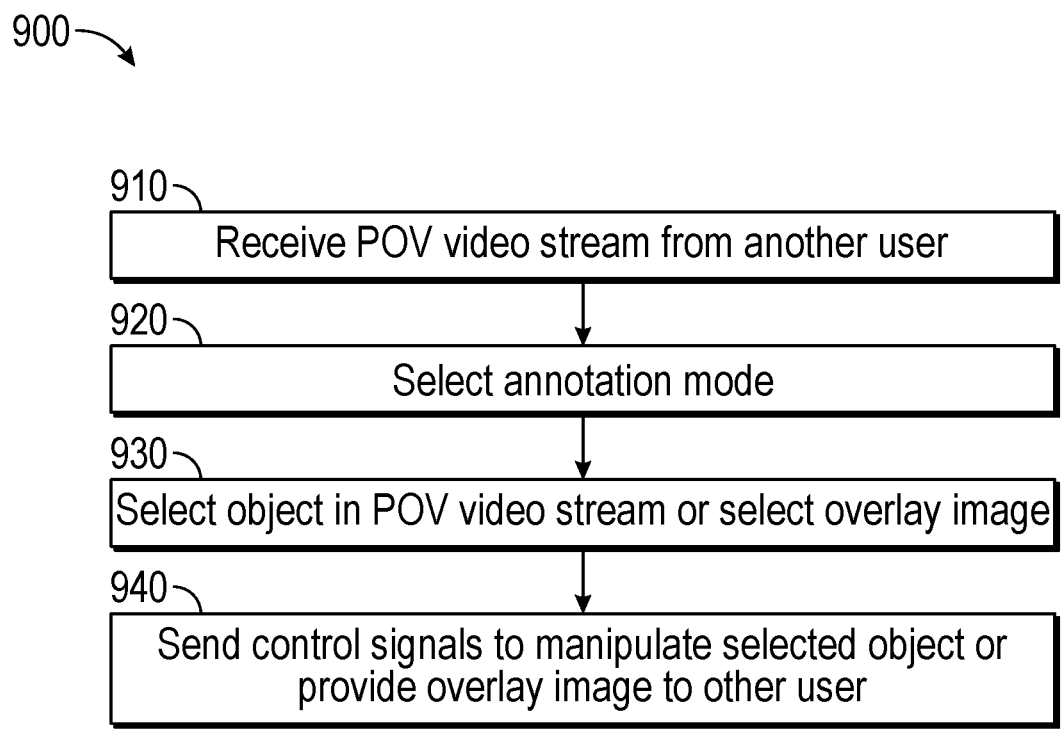
FIG. 9 illustrates a flowchart of software on each user's portable electronic eyewear device or associated mobile device for annotating a video stream from another user and providing the annotated stream to the first user during a session.

FIG. 9 illustrates a flowchart 900 of software on each user's portable electronic eyewear device 100 or 200 or associated mobile device 500 for annotating a video stream from another user and providing the annotated stream to the first user during a session. In this example, a user receives a point of view (POV) video stream or audio/video stream from another user at 910. The user elects an annotation mode at 920, which enables the user to select an object in the received video using object recognition functionality or to select an overlay (e.g., an arrow) at 930. The user's electronic eyewear device 100 or 200 or mobile device 500 may send control signals to the other user's electronic eyewear device to manipulate the selected object. Alternatively, an overlay image (e.g., a circle or arrow) registered with the POV image may be sent to the other user to display on the other user's display as an annotation of the image displayed on the other user's electronic eyewear device 100 or 200 at 940. The control signals provided at 940 may include audio control signals, video control signals, haptic control signals, or combinations thereof to control the presentation on the display of the remote user's electronic eyewear device 100 or 200.

The systems and methods described above thus allow users to share and annotate images from the POV of other users of electronic eyewear device 100 or 200. The duration of the sessions amongst users may be unlimited or may be limited by the battery and thermal limits of the respective electronic eyewear devices 100 or 200. Visual indicators also may be provided to each user's display to identify the source of the received audio streams, video streams, or both.

In another configuration, a user may provide an open livestreaming session of an audio/video stream from the user's electronic eyewear device 100 or 200 for any interested user in a 1-to-n configuration. In this case, the session may be established with the backend server 498 whereby the session is selectable from the backend server 498 by other users of the social media application. Any number of other users may elect to drop in on the livestream from the other user's electronic eyewear device 100 or 200.

In yet another configuration, the source of the audio/video livestream may move amongst the participants in a session. In such a case, the source of the audio/video livestream may be identified to the other participants in the session using a visual indicator (e.g., picture of user providing the audio/video livestream) identifying the source of the livestream as well as the status of other participants in the session. In one configuration, an orb may be provided that changes based on the user perspective of the livestream feed. Different orbs may enable different participants to drop in on different members within a group session. The time duration for the video streams may be limited to, e.g., 10-30 seconds to prevent the monopolization of the video streaming by a single user.

It will be appreciated that the video livestream may include photos instead of videos.

In still another configuration, the participants in a session may maintain an audio connection throughout a session while only one of the participants may record video and provide a livestream audio/video feed to the other participants.

As noted above, the electronic eyewear device 100 or 200 may communicate directly with the backend server system 498, provided the electronic eyewear device 100 has the requisite circuitry to communicate directly over an Internet connection. However, the communication may be picked up by the second user by conventional means without pairing, such as directly via their electronic eyewear device 100 or their mobile device 500.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on a head of a first user, comprising:
    at least one camera arranged to capture a point of view (POV) video stream in an environment of the first user;
    a microphone arranged to capture an audio stream in the environment of the first user;
    a display;
    a memory that stores instructions; and
    a processor that executes the instructions to perform operations including:
    establishing an always-on communication session with another electronic eyewear device adapted to be worn on a head of a second user;
    selectively sharing the audio stream and the POV video stream with the another electronic eyewear device of the second user during the communication session;
    enabling the first user to annotate the selectively shared POV video stream during the communication session by selecting an object in the selectively shared POV video stream and manipulating the object or registering an overlay image with the selectively shared POV video stream; and
    providing the selectively shared POV video stream with control signals for manipulating the selected object or with the overlay image for display on a video display of the another electronic eyewear device of the second user.

2. The electronic eyewear device of claim 1, wherein execution of the instructions causes the processor to perform additional operations including:
    receiving from the second user annotations of the selectively shared POV video stream for display on the display with the selectively shared POV video stream from the at least one camera.

3. The electronic eyewear device of claim 1, wherein execution of the instructions causes the processor to perform additional operations including:
    enabling the first user to modify a duration of sharing of the audio stream of and POV video stream.

4. The electronic eyewear device of claim 1, wherein execution of the instructions causes the processor to perform additional operations including:
    providing a notification to the display when the second user has opted to view the POV video stream, listen to the audio stream, or both.

5. The electronic eyewear device of claim 1, wherein execution of the instructions causes the processor to perform additional operations including:
    activating a social media application to identify and select at least the second user to participate in the communication session;
    selecting permissions for at least the second user to access at least one of the at least one camera, microphone, or display; and
    sharing the permission with at least the second user upon establishment of the communication session.

6. The electronic eyewear device of claim 5, wherein the at least one camera comprises at least two cameras that capture respective POV video streams in the environment of the first user, and wherein selecting permissions includes execution of instructions to cause the processor to perform additional operations including:
    determining which POV video stream from the at least two cameras the second user may access and for how long and whether the audio stream may be accessed by the second user and for how long.

7. The electronic eyewear device of claim 1, wherein selectively sharing the audio stream and the POV video stream with the another electronic eyewear device of the second user during the communication session includes execution of instructions to cause the processor to perform additional operations including:
  initiating an audio stream, POV video stream, or both to share with the second user or receiving a request from the second user to drop in on at least one of the audio stream or POV video stream that is currently being captured by at least one of the camera or the microphone.

8. The electronic eyewear device of claim 1, wherein execution of the instructions causes the processor to perform additional operations including:
  determining that a predetermined amount of time has expired since sharing of the of the audio stream and the POV video stream began or that the second user has elected to end the sharing of the audio stream and the POV video stream.

9. The electronic eyewear device of claim 1, wherein execution of the instructions causes the processor to perform additional operations including:
  annotating a POV video stream received from the second user during the communication session by selecting an object in the POV video stream and sending control signals to the electronic eyewear device of the second user to manipulate the selected object.

10. The electronic eyewear device of claim 9, wherein the control signals include at least one of audio control signals, video control signals, or haptic control signals.

11. The electronic eyewear device of claim 1, wherein execution of the instructions causes the processor to perform additional operations including:
  selecting an overlay image;
  registering the overlay image with the selectively shared POV video stream; and
  sending the registered overlay image to the electronic eyewear device of the second user for display over the selectively shared POV video stream.

12. The electronic eyewear device of claim 1, wherein execution of the instructions causes the processor to perform additional operations including:
  presenting a visual indicator to the display identifying which electronic eyewear device participating in the communication session acted as a source of the selectively shared POV video stream and audio stream.

13. The electronic eyewear device of claim 12, wherein presenting the visual indicator to the display includes execution of the instructions to cause the processor to perform additional operations including:
  presenting an orb to the display that changes based on a user perspective of the selectively shared POV video stream or audio stream.

14. The electronic eyewear device of claim 1, wherein establishing the communication session with another electronic eyewear device includes execution of instructions to cause the processor to perform additional operations including:
  establishing a livestreaming session of at least one of audio or video to a server for selection by the second user.

15. A method of providing hyper-connectivity between a first user of a first electronic eyewear device and a second user of a second electronic eyewear device, including:
  establishing an always-on communication session between the first electronic eyewear device and the second electronic eyewear device;
  selectively sharing an audio stream and a point of view (POV) video stream from the first electronic eyewear device with the second electronic eyewear device during the communication session;
  enabling the first user to annotate the selectively shared POV video stream during the communication session by selecting an object in the selectively shared POV video stream and manipulating the object or registering an overlay image with the selectively shared POV video stream; and
  providing the selectively shared POV video stream with control signals for manipulating the selected object or with the overlay image for display on a video display of the another electronic eyewear device of the second user.

16. The method of claim 15, further comprising receiving annotations from the second user of the selectively shared POV video stream for display with the selectively shared POV video stream.

17. The method of claim 15, further comprising annotating a POV video stream received from the second user during the communication session by selecting an object in the POV video stream and sending control signals to the electronic eyewear device of the second user to manipulate the selected object, the control signals including at least one of audio control signals, video control signals, or haptic control signals.

18. The method of claim 15, further comprising annotating a POV video stream received from the second user during the communication session by selecting an overlay image, registering the overlay image with a selectively shared POV video stream, and sending the registered overlay image to the second electronic eyewear device for display over the selectively shared POV video stream.

19. A non-transitory computer-readable storage medium that stores instructions that when executed by at least one processor cause the at least one processor to provide hyper-connectivity between a first user of a first electronic eyewear device and a second user of a second electronic eyewear device by performing operations including:
  establishing an always-on communication session between the first electronic eyewear device and the second electronic eyewear device;
  selectively sharing an audio stream and a point of view (POV) video stream from the first electronic eyewear device with the second electronic eyewear device during the communication session;
  enabling the first user to annotate the selectively shared POV video stream during the communication session by selecting an object in the selectively shared POV video stream and manipulating the object or registering an overlay image with the selectively shared POV video stream; and
  providing the selectively shared POV video stream with control signals for manipulating the selected object or with the overlay image for display on a video display of the another electronic eyewear device of the second user.

20. The medium of claim 19, further comprising instructions that when executed by the at least one processor cause the at least one processor to receive annotations from the second user for display with the selectively shared POV video stream on the first electronic eyewear device.

\* \* \* \* \*